(12) United States Patent
Kim et al.

(10) Patent No.: US 10,699,718 B2
(45) Date of Patent: Jun. 30, 2020

(54) SPEECH RECOGNITION SYSTEM AND SPEECH RECOGNITION METHOD THEREOF

(71) Applicant: SAMSUNG ELECTRONICS CO., LTD., Suwon-si (KR)

(72) Inventors: Tae-yoon Kim, Seoul (KR); Sang-ha Kim, Seoul (KR); Chang-woo Han, Seoul (KR); Jae-won Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/067,341

(22) Filed: Mar. 11, 2016

(65) Prior Publication Data

US 2016/0267913 A1 Sep. 15, 2016

Related U.S. Application Data

(60) Provisional application No. 62/132,909, filed on Mar. 13, 2015.

(30) Foreign Application Priority Data

Jan. 29, 2016 (KR) .......................... 10-2016-0011838

(51) Int. Cl.
 *G10L 15/04* (2013.01)
 *G10L 15/22* (2006.01)
 (Continued)

(52) U.S. Cl.
 CPC ............ *G10L 17/24* (2013.01); *G06F 1/3215* (2013.01); *G06F 1/3231* (2013.01); *G10L 15/22* (2013.01);
 (Continued)

(58) Field of Classification Search
 USPC ......................................................... 704/252
 See application file for complete search history.

(56) References Cited

U.S. PATENT DOCUMENTS 6,493,669 B1 * 12/2002 Curry ...................... G10L 15/26
 704/257
6,526,380 B1 * 2/2003 Thelen .................... G10L 15/32
 704/251
(Continued)

FOREIGN PATENT DOCUMENTS

EP 2669889 A2 12/2013
EP 2816554 A2 12/2014
(Continued)

OTHER PUBLICATIONS

Communication dated Jul. 27, 2016, issued by the European Patent Office in counterpart European Application No. 16157937.0.

*Primary Examiner* — Daniel C Washburn
*Assistant Examiner* — Timothy Nguyen
(74) *Attorney, Agent, or Firm* — Sughrue Mion, PLLC

(57) ABSTRACT

A device detects a wake-up keyword from a received speech signal of a user by using a wake-up keyword model, and transmits a wake-up keyword detection/non-detection signal and the received speech signal of the user to a speech recognition server. The speech recognition server performs a recognition process on the speech signal of the user by setting a speech recognition model according to the detection or non-detection of the wake-up keyword.

17 Claims, 13 Drawing Sheets

(51) Int. Cl.
*G10L 15/30* (2013.01)
*G10L 17/24* (2013.01)
*G06F 1/3215* (2019.01)
*G06F 1/3231* (2019.01)
*G10L 17/20* (2013.01)

(52) U.S. Cl.
CPC .............. *G10L 15/30* (2013.01); *G10L 17/20* (2013.01); *G10L 2015/223* (2013.01); *Y02D 10/173* (2018.01)

(56) References Cited

U.S. PATENT DOCUMENTS

| | | | |
|---|---|---|---|
| 7,774,204 B2 | 8/2010 | Mozer et al. | |
| 8,543,834 B1 | 9/2013 | Barra | |
| 8,924,219 B1* | 12/2014 | Bringert | G06F 3/04842 704/275 |
| 2006/0111909 A1* | 5/2006 | Maes | H04L 29/06027 704/270 |
| 2007/0156403 A1* | 7/2007 | Coifman | G10L 15/08 704/252 |
| 2009/0089065 A1* | 4/2009 | Buck | B60R 16/0373 704/275 |
| 2009/0204410 A1* | 8/2009 | Mozer | G10L 15/30 704/275 |
| 2010/0169093 A1* | 7/2010 | Washio | G10L 15/063 704/243 |
| 2011/0093265 A1* | 4/2011 | Stent | G10L 15/06 704/243 |
| 2011/0144999 A1* | 6/2011 | Jang | G06K 9/00892 704/270.1 |
| 2013/0006634 A1* | 1/2013 | Grokop | G10L 17/10 704/245 |
| 2013/0085757 A1 | 4/2013 | Nakamura et al. | |
| 2013/0275138 A1* | 10/2013 | Gruber | G10L 13/00 704/260 |
| 2013/0289994 A1 | 10/2013 | Newman et al. | |
| 2013/0325484 A1 | 12/2013 | Chakladar et al. | |
| 2014/0222436 A1* | 8/2014 | Binder | G06F 3/167 704/275 |
| 2014/0229184 A1 | 8/2014 | Shires | |
| 2014/0244259 A1* | 8/2014 | Rosario | G10L 15/19 704/254 |
| 2014/0249817 A1* | 9/2014 | Hart | G10L 15/22 704/239 |
| 2014/0281628 A1 | 9/2014 | Nigam et al. | |
| 2015/0039303 A1* | 2/2015 | Lesso | G10L 15/28 704/233 |
| 2015/0106085 A1* | 4/2015 | Lindahl | G10L 15/32 704/231 |
| 2015/0154953 A1* | 6/2015 | Bapat | G10L 15/06 704/251 |
| 2015/0340040 A1* | 11/2015 | Mun | G10L 17/22 704/246 |
| 2016/0253998 A1* | 9/2016 | Iyer | G10L 15/22 704/275 |
| 2016/0379629 A1* | 12/2016 | Hofer | G06F 17/277 704/257 |
| 2016/0379633 A1* | 12/2016 | Lehman | G10L 15/22 704/275 |
| 2016/0379635 A1* | 12/2016 | Page | G10L 15/22 704/251 |
| 2017/0154210 A1* | 6/2017 | Li | G06K 9/00315 |

FOREIGN PATENT DOCUMENTS

JP 2013-80015 A 5/2013
KR 10-2013-0133629 A 12/2013

* cited by examiner

SPEECH RECOGNITION SYSTEM AND SPEECH RECOGNITION METHOD THEREOF

CROSS-REFERENCE TO RELATED APPLICATIONS

This application claims the benefit of U.S. Provisional Application No. 62/132,909, filed on Mar. 13, 2015, and Korean Patent Application No. 10-2016-0011838, filed on Jan. 29, 2016, in the Korean Intellectual Property Office, the disclosures of which are incorporated herein in their entireties by reference.

BACKGROUND

1. Field

Apparatuses and methods consistent with exemplary embodiments relate to speech recognition, and more particularly, to speech recognition based on a wake-up keyword.

2. Description of the Related Art

A number of the smart devices having speech recognition to enable the functions of the devices to be executed by using a user's speech signal has been steadily increasing.

In order to enable the speech recognition function of the device, the speech recognition function of the device needs to be activated. A related art speech recognition function is activated by using a fixed wake-up keyword. Accordingly, when a plurality of devices having the same speech recognition function are present in a proximity to each other, a speech recognition function of an unintended device may be activated by the user using the fixed wake-up keyword.

In addition, a related art speech recognition function separately processes a wake-up keyword and a voice command of a user. Thus, after inputting a wake-up keyword, a user needs to input a voice command after a speech recognition function of a device is activated. If a user continuously or substantially contemporaneously inputs a wake-up keyword and a voice command for the same device or different devices, the related art speech recognition function might not be activated or activated correctly, or a speech recognition error may occur with respect to the input voice command even though the speech recognition function is activated.

Therefore, there is a need for methods and apparatuses capable of accurately recognizing a user voice command while reliably initiating a speech recognition function of a device.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide convenient and accurate speech recognition functions that continuously recognize a personalized wake-up keyword and a voice command.

One or more exemplary embodiments provide speech recognition functions that are activated more effectively by using a personalized wake-up keyword.

One or more exemplary embodiments provide speech recognition functions that are activated more effectively by using a personalized wake-up keyword according to device-based environment information.

According to an aspect of an exemplary embodiment, a device includes: an audio input unit configured to receive a speech signal of a user; a memory configured to store a wake-up keyword model; a communicator configured to communicate with a speech recognition server; and a processor configured to, when the speech signal of the user is received through the audio input unit, detect a wake-up keyword from the speech signal of the user by using the wake-up keyword model, transmit a wake-up keyword detection/non-detection signal and the speech signal of the user to the speech recognition server via the communicator, receive a speech recognition result from the speech recognition server via the communicator, and control the device according to the speech recognition result.

According to an aspect of an exemplary embodiment, a speech recognition server includes: a communicator configured to communicate with at least one device; a memory configured to store a wake-up keyword model and a speech recognition model; and a processor configured to set a speech recognition model combined with the wake-up keyword model when a wake-up keyword detection/non-detection signal and a speech signal of a user are received from one selected from among at least one device via the communicator, recognize the speech signal of the user by using the set speech recognition model, remove the wake-up keyword from a speech recognition result with respect to the speech signal of the user, and transmit the speech recognition result, from which the wake-up keyword is removed, to the device via the communicator.

According to an aspect of an exemplary embodiment, a speech recognition system includes: a device configured to detect a wake-up keyword from a speech signal of a user; and a speech recognition server configured to set a speech recognition model combined with the wake-up keyword model when a wake-up keyword detection/non-detection signal and the speech signal of the user are received from the device, and recognize the speech signal of the user by using the set speech recognition model, and transmit a speech recognition result to the device.

According to an aspect of an exemplary embodiment, a speech recognition method, which is performed by a device, includes: when a speech signal of a user is received, detecting a wake-up keyword from the speech signal of the user by using a wake-up keyword model; transmitting a wake-up keyword detection/non-detection signal and the speech signal of the user to a speech recognition server; receiving a result of recognizing the speech signal of the user from the speech recognition server; and controlling the device according to the result of recognizing the speech signal of the user.

According to an aspect of an exemplary embodiment, a speech recognition method, which is performed by a speech recognition server, includes: receiving a wake-up keyword detection/non-detection signal and a speech signal of a user to a device; setting a speech recognition model according to the wake-up keyword detection/non-detection signal; recognize the speech signal of the user by using the set speech recognition model; removing the wake-up keyword from a result of recognizing the speech signal of the user, and transmitting the result of recognizing the speech signal of the user, from which the wake-up keyword is removed, to the device.

The wake-up keyword model is one of a plurality of wake-up keyword models which are based on various environment information, the method further includes receiving, from the device, environment information about the device, and the setting the speech recognition model includes setting the speech recognition model combined with the wake-up keyword model corresponding to the environment information of the device, among the plurality of wake-up keyword models.

The method further includes receiving identification information of the user, from the device, wherein the setting the speech recognition model includes setting the speech recognition model combined with the wake-up keyword based on the environment information of the device and the identification information of the user.

According to an aspect of an exemplary embodiment, a speech recognition method, which is performed by a speech recognition system, includes: registering a wake-up keyword model in a device and a speech recognition server; when a speech signal of a user is received through the device, detecting the wake-up keyword from the speech signal of the user by using the wake-up keyword model; transmitting a wake-up keyword detection/non-detection signal and the speech signal of the user from the device to the speech recognition server; setting, by the speech recognition server, a speech recognition model according to the wake-up keyword detection/non-detection signal; recognizing, by the speech recognition server, the speech signal of the user by using the set speech recognition model; removing, by the speech recognition server, the wake-up keyword from a result of recognizing the speech signal of the user; transmitting the result of recognizing the speech signal of the user, from which the wake-up keyword is removed, from the speech recognition server to the device; and controlling, by the device, the device according to the received result of recognizing the speech signal of the user.

According to an aspect of an exemplary embodiment, a device including: an audio input receiver configured to receive an audio signal from a user, the audio signal including a wake-up keyword; a memory configured to store wake-up keyword models for identifying the wake-up keyword from the received audio signal; and a processor configured to perform: detecting the wake-up keyword from the received audio signal by matching the wake-up keyword included into the received audio signal with the stored wake-up keyword models, generating a detection value indicative whether the wake-up keyword has been detected or not, based on a result of the matching, transmitting the detection value and the received audio signal to a server, receiving, from the server, a speech recognition result of the audio signal that is translated based on the detection value, and controlling an executable application of the device in performing a device function, based on the speech recognition result.

The detection value indicates that the wake-up keyword has been detected in the received audio signal, and the processor is configured to receive the speech recognition result which includes a user command to execute the application, and in which the wake-up keyword itself is absent.

The audio input receiver is configured to receive, in advance, individual user inputs containing individual keywords related to a control of executable applications of the device, and the memory is configured to store the wake-up keyword models based on the received individual keywords.

According to an aspect of an exemplary embodiment, a method includes: storing, in a first memory, wake-up keyword models which are used to identify wake-up keywords; receiving an audio signal from a user, the audio signal including the wake-up keyword; detecting the wake-up keyword from the received audio signal by matching the wake-up keyword included into the received audio signal with the stored wake-up keyword models; generating a detection value indicative whether the wake-up keyword has been detected or not based on a result of the matching; transmitting the detection value and the received audio signal to a server; receiving, from the server, a speech recognition result of the audio signal that is translated based on the detection value; and controlling an executable application of the device in performing a device function, based on the speech recognition result.

The method further includes storing, in a second memory, a speech recognition model which is used to translate the audio signal of the user and the wake-up keyword models which are synchronized with the wake-up keyword models stored in the first memory, wherein the receiving the speech recognition result includes: identifying, by the server, whether the audio signal contains the wake-up keyword, from the detection value; and translating, by the server, the audio signal into the speech recognition result based on a combination model in which the speech recognition model is combined with a respective wake-up keyword model in response to the detection value indicating that the audio signal contains the wake-up keyword.

The receiving the speech recognition result further includes: generating, by the server, the speech recognition result by removing the wake-up keyword from the speech recognition result, and receiving, from the server, the speech recognition result of the audio signal from which the wake-up keyword has been removed; wherein the controlling includes controlling the executable application of the device according to the speech recognition result from which the wake-up keyword has been removed.

The translating includes translating the audio signal into the speech recognition result by using the speech recognition model only, in response to the detection value indicating that the audio signal does not contain the wake-up keyword.

BRIEF DESCRIPTION OF THE DRAWINGS

The above and/or other aspects will become more apparent by describing certain exemplary embodiments with reference to the accompanying drawings, in which.

DETAILED DESCRIPTION

Figure 1:
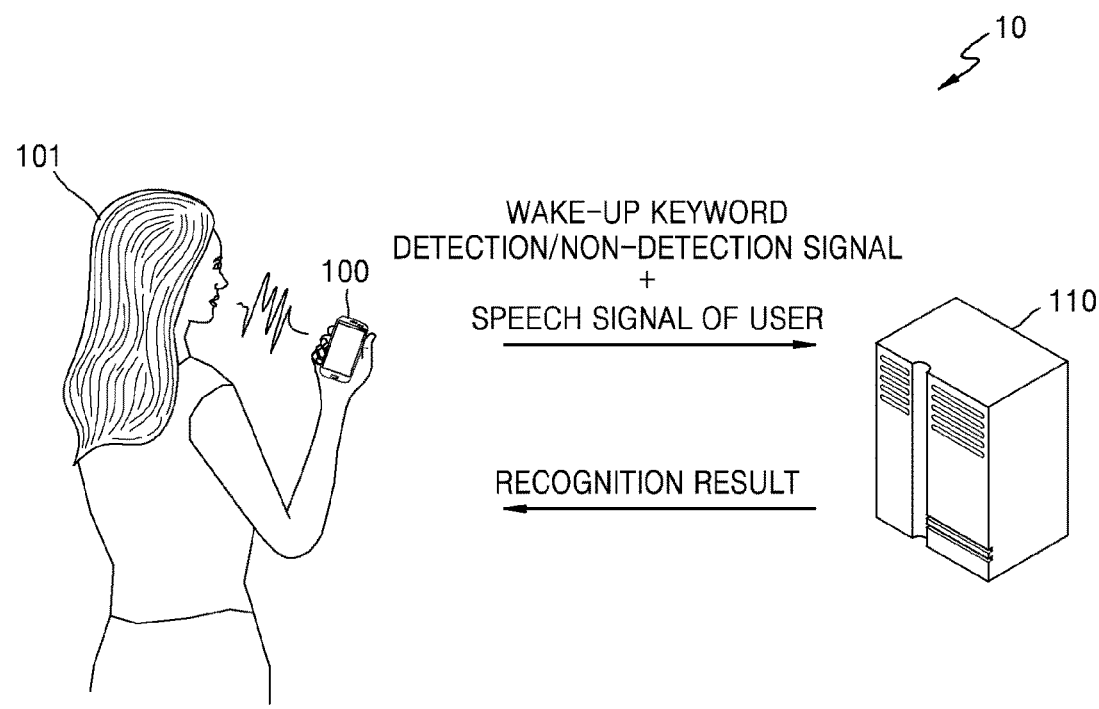
FIG. 1 is a diagram for describing a speech recognition system according to an exemplary embodiment.

Certain exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

As used herein, the term "and/or" includes any and all combinations of one or more of the associated listed items.

It will be understood that when a region is referred to as being "connected to" or "coupled to" another region, it may be directly connected or coupled to the other region or intervening regions may be present. It will be understood that terms such as "comprise", "include", and "have", when used herein, specify the presence of stated elements, but do not preclude the presence or addition of one or more other elements.

The term "wake-up keyword" used herein refers to information capable of activating or initiating a speech recognition function. The wake-up keyword used herein may be referred to as a wake-up word. The wake-up keyword used herein may be based on a speech signal of a user, but is not limited thereto. For example, the wake-up keyword used herein may include a sound (or audio signal) based on a gesture of a user.

The sound based on the gesture of the user may include, for example, a sound generated when the user strikes his/her fingers together. The sound based on the gesture of the user may include, for example, a sound generated when the user clicks his/her tongue. The sound based on the gesture of the user may include, for example, a sound of a user's laughter. The sound based on the gesture of the user may include, for example, a sound generated when the user's lips quiver. The sound based on the gesture of the user may include, for example, a sound of a user's whistle. The sound based on the gesture of the user is not limited to those described above.

When the wake-up keyword used herein includes the sound based on the gesture of the user, the wake-up keyword may be referred to as a wake-up keyword signal.

A wake-up keyword model used herein may refer to a wake-up keyword preregistered in a device and/or a speech recognition server so as to detect or recognize a wake-up keyword. The wake-up keyword model may include a personalized acoustic model and/or a personalized language model, but is not limited thereto. The acoustic model models signal characteristics of the speech of the user (or sound based on the gesture of the user). The language model models a linguistic sequence of words or syllables corresponding to recognition vocabulary.

Since the wake-up keyword model registered in the device is used for detecting the wake-up keyword, the wake-up keyword model used herein may be referred to as a model for wake-up keyword detection. Since the wake-up keyword model registered in the speech recognition server is used for detecting the wake-up keyword, the wake-up keyword model used herein may be referred to as a model for wake-up keyword recognition.

The model for wake-up keyword detection and the model for wake-up keyword recognition may be identical to or different from each other. For example, when the model for wake-up keyword detection includes an acoustic model corresponding to a personalized wake-up keyword "Hi", the model for wake-up keyword recognition may include, for example, an acoustic model corresponding to the personalized wake-up keyword "Hi" and a tag, e.g., "!", which is associated with and identifies the wake-up keyword. The model for wake-up keyword detection and the model for wake-up keyword recognition are not limited to those described above.

The model for wake-up keyword detection and the model for wake-up keyword recognition may be referred to as the wake-up keyword model. However, the wake-up keyword model registered in the device may be understood as the model for wake-up keyword detection, and the wake-up keyword model registered in the speech recognition server may be understood as the model for wake-up keyword recognition.

The wake-up keyword model may be generated by the device or the speech recognition server. The device or the speech recognition server may transmit and receive data so as to share the generated wake-up keyword model with each other.

The speech recognition function used herein may refer to converting the speech signal of the user into a character string or a text. The text may be human-perceptible phrase, sentence, or a set of words. The speech signal of the user may include a voice command. The voice command may execute a particular function of the device.

The particular function of the device used herein may include executing an executable application set in the device, but is not limited thereto.

For example, when the device is a smart phone, the executing of the application may include a phone call, route finding, Internet browsing, alarm setting, and/or any other appropriate executable function available in the smart phone. When the device is a smart television (TV), the executing of the application may include program searching, channel searching, Internet browsing, and/or any other appropriate executable function available in the smart TV. When the device is a smart oven, the executing of the application may include recipe searching, etc. When the device is a smart refrigerator, the executing of the application may include chilling state checking, freezing state checking, etc. When the device is a smart vehicle, the executing of the application may include automatic start-up, autonomous cruise, automatic parking, automatic media device turn on and turn off, automatic air control, etc. The described-above examples of the executable applications are not limited thereto.

The voice command used herein may be a word, a sentence, or a phrase. The speech recognition model used herein may include a personalized acoustic model and/or a personalized language model.

FIG. 1 is a diagram for describing a speech recognition system 10 according to an exemplary embodiment. The speech recognition system 10 may include a device 100 and a speech recognition server 110.

The device 100 may receive a speech signal from a user 101 that may include the wake-up keyword and the voice command. The device 100 may detect a wake-up keyword from the received speech signal of the user 101 by using a wake-up keyword model. The device 100 may generate, in advance, the wake-up keyword model, and register and store the generated wake-up keyword model in the device 100. The device 100 may transmit the generated wake-up keyword model to the speech recognition server 110. As another example, the device 100 may store the wake-up keyword model which has been received from the speech recognition server 110.

The device 100 may use the registered wake-up keyword model or the wake-up keyword model to detect the wake-up keyword from the received speech signal of the user 101. However, the speech signal of the user 101, which is received by the device 100, might not include the wake-up keyword or the device 100 might not be able to match the wake-up keyword with the stored wake-up keyword model.

The device 100 may generate and transmit a wake-up keyword detection/non-detection signal and the received speech signal of the user 101 to the speech recognition server 110. The wake-up keyword detection/non-detection signal is a signal that indicates whether the wake-up keyword has been detected from the received speech signal of the user 101.

The device 100 may represent the wake-up keyword detection/non-detection signal by binary data. When the wake-up keyword has been detected from the received speech signal of the user 101, the device 100 may represent the wake-up keyword detection/non-detection signal by, for example, "0". When the wake-up keyword has not been detected from the received speech signal of the user 101, the device 100 may represent the wake-up keyword detection/non-detection signal by, for example, "1".

The speech recognition server 110 may receive the wake-up keyword detection/non-detection signal and the speech signal of the user 101 from the device 100. The speech signal of the user 101, which is received from the device 100, may be substantially the same as the speech signal of the user 101, which is received by the device 100. Additionally, the device 100 may transmit the wake-up keyword model.

The speech recognition server 110 may set the speech recognition model according to the received wake-up keyword detection/non-detection signal. When the wake-up keyword detection/non-detection signal indicates that the wake-up keyword is included in the speech signal of the user 101, the speech recognition server 110 may set the speech recognition model to recognize the speech signal of the user 101 by using a combination model in which the speech recognition model is combined with the wake-up keyword model stored or received by the server 110.

In the speech recognition server 110, the wake-up keyword model that is combined with the speech recognition model is matched with the wake-up keyword detected by the device 100. For example, when the wake-up keyword detected by the device 100 is "Hi", the speech recognition server 110 may set the speech recognition model to recognize the speech signal of the user 101 by using "Hi+speech recognition model (for example, play the music)". When the wake-up keyword model is combined with the speech recognition model, the speech recognition server 110 may take into consideration a silence duration between the wake-up keyword model and the speech recognition model.

As described above, the speech recognition server 110 may stably secure the speech signal of the user 101 by continuously performing a recognition process on the wake-up keyword and the voice command included in the speech signal of the user 101, thereby improving the speech recognition performance of the speech recognition system 10.

When the wake-up keyword detection/non-detection signal indicates that the wake-up keyword is not included in the speech signal of the user 101, the speech recognition server 110 may set the speech recognition model to recognize the speech signal of the user 101 by using the speech recognition model that is not combined with the wake-up keyword model. Optionally, the speech recognition server 110 may verify that the wake-up keyword is included or is not included in the received speech signal of the user 101.

The speech recognition server 110 may dynamically reconfigure (or switch) the speech recognition model that is used for recognizing the speech of the user 101 according to the wake-up keyword detection/non-detection signal. Therefore, the setting of the speech recognition model according to the wake-up keyword detection/non-detection signal, which is performed by the speech recognition server 110, may be determining the configuration of the speech recognition model according to the detection or non-detection of the wake-up keyword.

The setting of the speech recognition model in the speech recognition server 110 may include loading the speech recognition model. Accordingly, the wake-up keyword detection/non-detection signal may be construed as including a speech recognition model loading request signal, a speech signal model setting request signal, or a speech recognition model loading trigger signal. The expression of the wake-up keyword detection/non-detection signal used herein is not limited to those described above.

The speech recognition server 110 may generate the speech recognition model for recognizing the voice command. The speech recognition model may include an acoustic model and a language model. The acoustic model models signal characteristics of the speech. The language model models a linguistic sequence relationship of words or syllables corresponding to recognition vocabulary.

The speech recognition server 110 may detect only a speech part from the received speech signal of the user 101. The speech recognition server 110 may extract speech characteristics from the detected speech part. The speech recognition server 110 may perform a speech recognition process on the received speech signal of the user 101 by using the extracted speech characteristics, characteristics of a preregistered acoustic model, and the language model. The speech recognition server 110 may perform the speech recognition process by comparing the extracted speech characteristics with the characteristics of the preregistered acoustic model. The speech recognition process, which is performed on the received speech signal of the user 101 by the speech recognition server 110, is not limited to those described above.

The speech recognition server 110 may remove the wake-up keyword from a speech recognition result of the speech recognition process. The speech recognition server 110 may transmit the speech recognition result, from which the wake-up keyword is removed, to the device 100.

The speech recognition server 110 may generate the wake-up keyword model. The speech recognition server 110 may transmit the generated wake-up keyword model to the device 100 while registering (or storing) the generated wake-keyword model in the speech recognition server 110. Accordingly, the device 100 and the speech recognition server 110 may share the wake-up keyword model with each other.

The device 100 may control the function of the device 100 according to the speech recognition result received from the speech recognition server 110.

When the device 100 or the speech recognition server 110 generates a plurality of wake-up keyword models, the device 100 or the speech recognition server 110 may allocate identification information to each of the wake-up keyword models. When the identification information is allocated to each of the wake-up keyword models, the wake-up keyword detection/non-detection signal transmitted from the device 100 to the speech recognition server 110 may include identification information about the detected wake-up keyword.

When the device 100 is a portable device, the device 100 may include at least one device among a smart phone, a notebook computer, a smart board, a tablet personal computer (PC), a handheld device, a handheld computer, a media player, an e-book device, and a personal digital assistant (PDA), but is not limited thereto.

When the device 100 is a wearable device, the device 100 may include at least one device among smart glasses, smart watches, smart bands (e.g., smart waistbands, smart headbands, etc.), various smart accessories (e.g., smart rings, smart bracelets, smart ankle bracelets, smart hairpins, smart clips, smart necklaces, etc.), various smart body protectors (e.g., smart knee pads, smart elbow pads, etc.), smart shoes, smart gloves, smart clothes, smart hats, smart artificial legs, and smart artificial hands, but is not limited thereto.

The device 100 may include a device based on a Machine-to-Machine (M2M) or Internet of Things (IoT) network (e.g., smart household appliances, smart sensors, etc.), vehicles, and vehicle navigation devices, but is not limited thereto.

The device 100 and the speech recognition server 110 may be connected to each other via a wired and/or wireless network. The device 100 and the speech recognition server 110 may be connected to each other via a short-range wireless network and/or a long-range wireless network.

Figure 2:
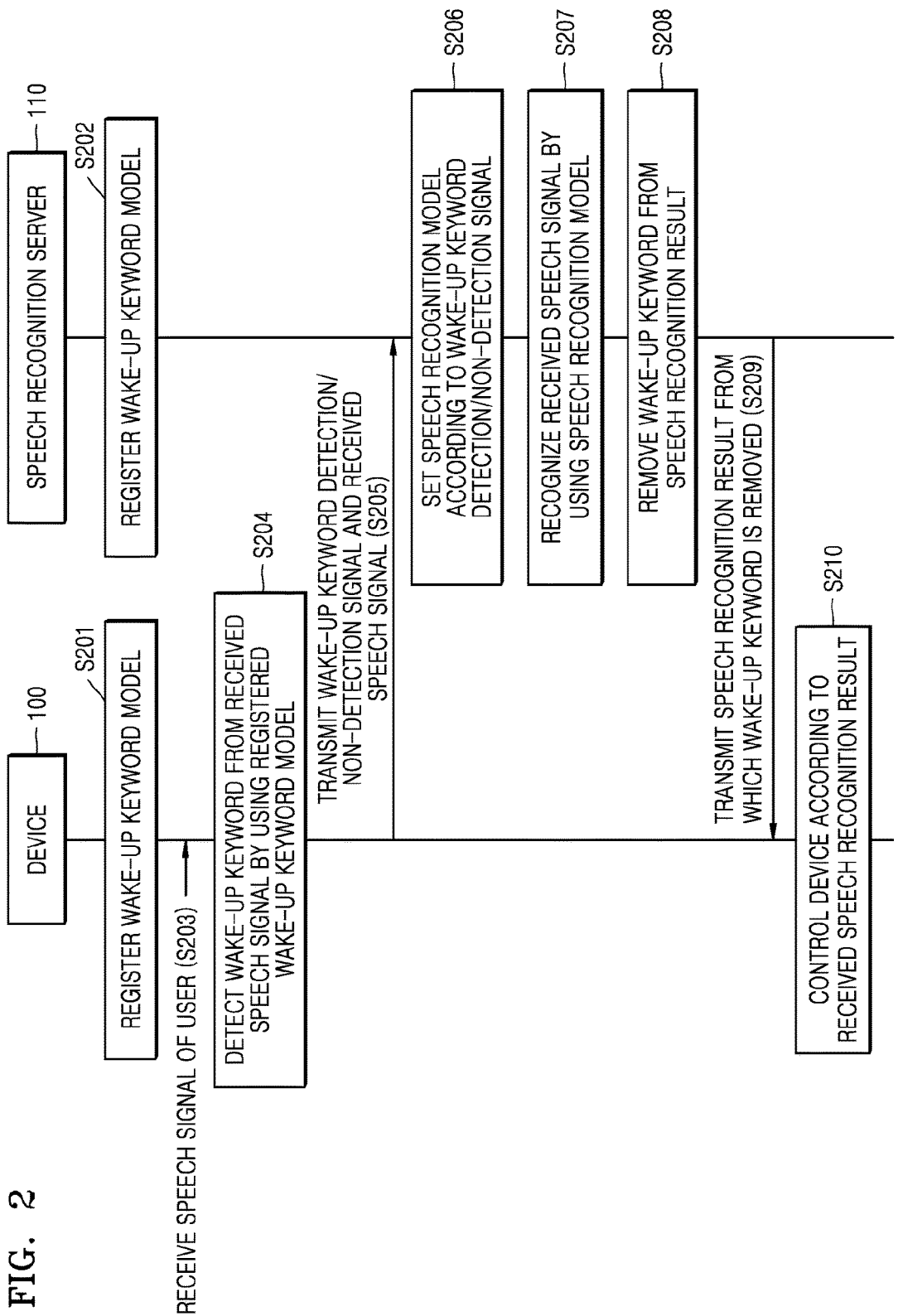
FIG. 2 is a flowchart of a speech recognition method according to an exemplary embodiment, which is performed based on a device and a speech recognition server included in the speech recognition system.

FIG. 2 is a flowchart of a speech recognition method according to an exemplary embodiment, which is performed based on the device 100 and the voice recognition server 110 included in the speech recognition system 10. FIG. 2 illustrates a case where the speech recognition is performed based on the speech signal of the user 101.

Referring to FIG. 2, in operation S201, the device 100 may register the wake-up keyword model, as described in detail below with reference to FIGS. 3 and 4.

Figure 3:
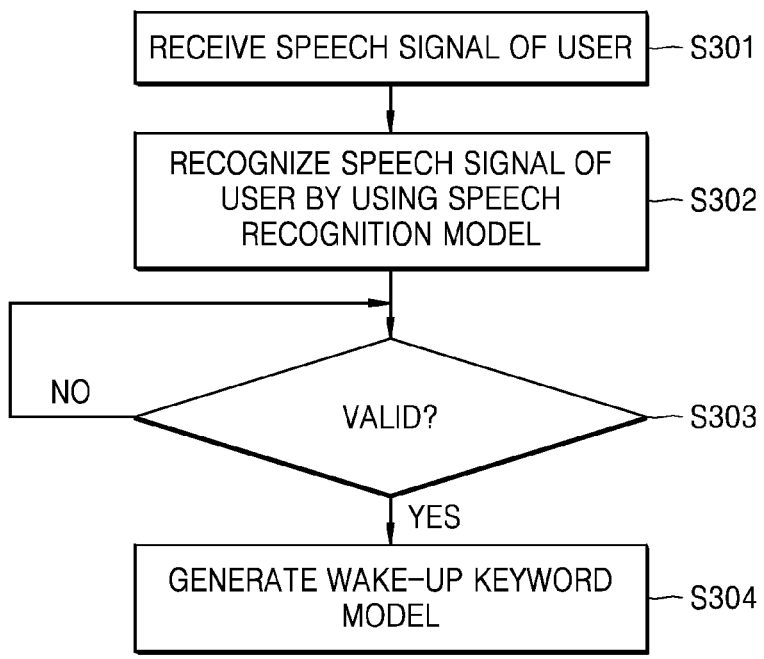
FIG. 3 is a flowchart of a process of registering a wake-up keyword model in the speech recognition method according to an exemplary embodiment.

FIG. 3 is a flowchart of registering the wake-up keyword model in the speech recognition method according to an exemplary embodiment.

Referring to FIG. 3, in operation S301, the device 100 may receive the speech signal of the user 101. The speech signal of the user 101, which is received in operation S301, is used for registering the wake-up keyword model. In operation S301, the device 100 may receive a sound (or audio signal) based on a particular gesture of the user 101, instead of the speech signal of the user 101.

In operation S302, the device 100 may recognize the speech signal of the user 101 by using the speech recognition model. The speech recognition model may include an acoustic model and/or a language model based on automatic speech recognition (ASR), but is not limited thereto.

In operation S303, the device 100 may determine whether the received speech signal of the user 101 is valid as the wake-up keyword model, based a speech matching rate of the speech signal of the user 101.

For example, in a case where the device 100 recognizes the speech signal of the user 101 twice or more times and compares recognition results, if consistent results come out a preset number of times or more, the device 100 may determine that the received speech signal of the user 101 is valid as the wake-up keyword model.

When it is determined in operation S303 that the received speech signal of the user 101 is valid as the wake-up keyword model, the device 100 may generate and/or register the wake-up keyword model in the device 100 in operation S304. The registering of the wake-up keyword model in the device 100 may mean storing the wake-up keyword model in the device 100.

In operation S303, in a case where the device 100 recognizes the speech signal of the user 101 twice or more times and compares recognition results, if a number of consistent recognition results is below the preset number of times, the device 100 may determine that the received speech signal of the user 101 is invalid as the wake-up keyword model.

When it is determined in operation S303 that the received speech signal of the user 101 is invalid as the wake-up keyword model, the device 100 does not register the received speech signal of the user 101 as the wake-up keyword model.

When it is determined in operation S303 that the received speech signal of the user 101 is invalid as the wake-up keyword model, the device 100 may output a notification message. The notification message may have various forms and contents. For example, the notification message may include a message indicating that "the currently input speech signal of the user 101 is not registered as the wake-up keyword model." The notification message may include a message guiding for the user 101 to input a speech signal that is registrable as the wake-up keyword model.

Figure 4:
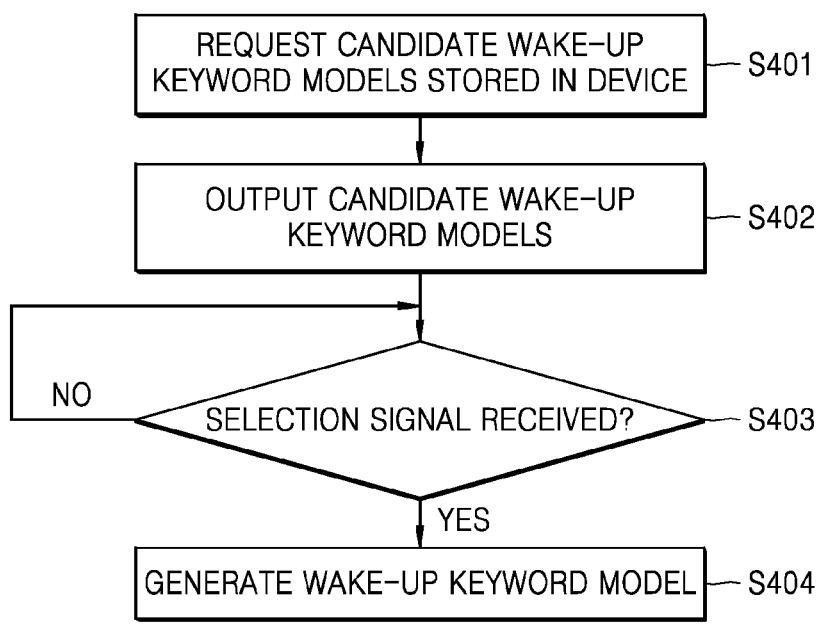
FIG. 4 is a flowchart of another process of registering a wake-up keyword model in the speech recognition method according to an exemplary embodiment.

FIG. 4 is a flowchart of registering the wake-up keyword model in the speech recognition method according to an exemplary embodiment.

In operation S401, the device 100 may request candidate wake-up keyword models stored therein. The request for the candidate wake-up keyword models may be based on the speech signal of the user 101, but is not limited thereto. For example, the device 100 may receive a user input of requesting the candidate wake-up keyword models according to a particular button control (or dedicated button) of the device 100 or a touch-based input.

In operation S402, the device 100 may output the candidate wake-up keyword models. The device 100 may output the candidate wake-up keyword models through a display of the device 100.

Figure 5A:
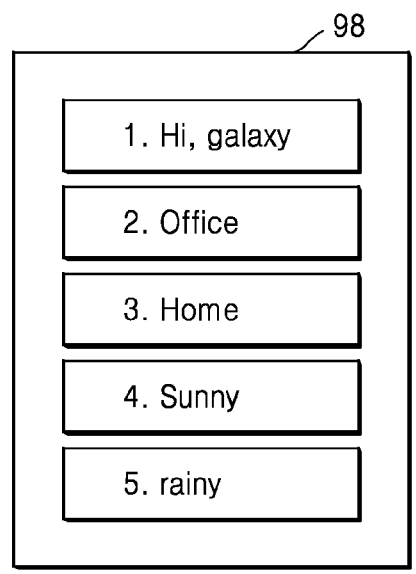
FIGS. 5A and 5B illustrate examples of candidate wake-up keyword models displayed on a display of the device included in the speech recognition system according to an exemplary embodiment.
Figure 5B:
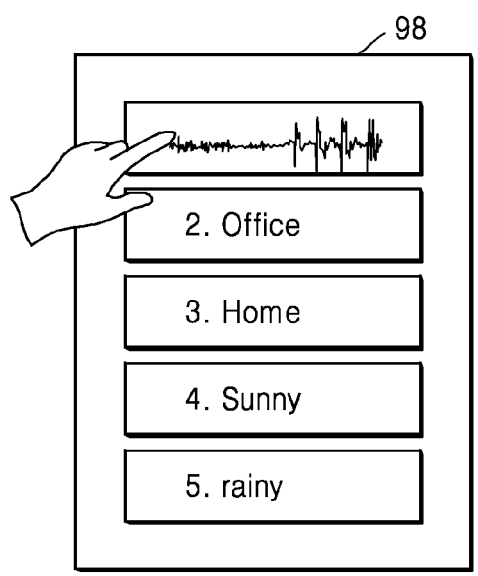

FIGS. 5A and 5B illustrate examples of candidate wake-up keyword models displayed on the display of the device 100 included in the speech recognition system 10 according to an exemplary embodiment.

FIG. 5A illustrates an example of a candidate wake-up keyword model list displayed on the display 98 of the device 100. Referring to FIG. 5A, the candidate wake-up keyword model is provided in a text form.

When a touch-based input of selecting a first candidate wake-up keyword model is received based on the candidate wake-up keyword model list illustrated in FIG. 5A, the device 100 may output an audio signal corresponding to the selected first candidate wake-up keyword model while displaying a speech waveform of the selected first candidate wake-up keyword model as illustrated in FIG. 5B. Accordingly, before selecting the wake-up keyword model, the user 101 may confirm the wake-up keyword model to be selected.

In operation S402, the device 100 may output the candidate wake-up keyword models through an audio output transmitter (e.g., speaker) of the device 100.

When a selection signal of selecting one candidate wake-up keyword model among the candidate wake-up keyword models is received in operation S403, the device 100 may automatically generate and/or register the selected candidate wake-up keyword model in operation S404. As another example, the device 100 may request the input of the speech signal of the user 101 corresponding to the selected candidate wake-up keyword model, generate the received speech signal of the user 101 as the wake-up keyword model, and/or register the wake-up keyword model.

Referring again to FIG. 2, in operation S201, the device 100 may set a communication channel for the speech recognition server 110 and request the wake-up keyword model while transmitting the received speech signal of the user 101 to the speech recognition server 110 via the set communication channel. Accordingly, the device 100 may receive the wake-up keyword model generated by the speech recognition server 110.

In operation S202, the speech recognition server 110 may register the wake-up keyword model. In operation S202, the speech recognition server 110 may register the wake-up keyword model received from the device 100, but the method of registering the wake-up keyword model in the speech recognition server 110 is not limited to those described above.

For example, the speech recognition server 110 may request the device 100 to send the wake-up keyword model and receive the wake-up keyword model. To this end, the speech recognition server 110 may monitor the device 100. The speech recognition server 110 may periodically monitor the device 100. When the approach of the device 100 is detected, the speech recognition server 110 may monitor the device 100. When the connection of the device 100 to the speech recognition server 110 is detected, the speech recognition server 110 may request the device 100 to send the wake-up keyword model.

In operation S202, when the wake-up keyword model is registered, the speech recognition server 110 may add a tag, which identifies the wake-up keyword, to the wake-up keyword model. The tag may be represented by a special symbol (e.g., !), but is not limited thereto.

In operation S202, the wake-up keyword model registered in the speech recognition server 110 may be synchronized with the wake-up keyword model registered in the device 100. When the wake-up keyword model registered in the device 100 is updated, the wake-up keyword model registered in the speech recognition server 110 may be updated.

As another example, in operation S202, the speech recognition server 110 may receive the speech signal of the user 101 from the device 100 and generate and register the wake-up keyword model, prior to operation S201. The speech recognition server 110 may generate the wake-up keyword model, as described above with reference to FIG. 3 or 4.

In operation S203, the device 100 may receive the speech signal of the user 101. In operation S204, the device 100 may detect the wake-up keyword from the received speech signal of the user 101 by using the registered wake-up keyword model. The device 100 may detect the wake-up keyword by comparing signal characteristics between the registered wake-up keyword model and the received speech signal of the user 101.

In operation S205, the device 100 may transmit the wake-up keyword detection/non-detection signal and the received speech signal of the user 101 to the speech recognition server 110.

In operation S206, the speech recognition server 110 may set the speech recognition model according to the received wake-up keyword detection/non-detection signal. The setting of the speech recognition model may be the same as described with reference to FIG. 1. That is, when the wake-up keyword detection/non-detection signal indicates that the wake-up keyword has been detected, the speech recognition server 110 may set the speech recognition model that is combined with the wake-up keyword model. When the wake-up keyword detection/non-detection signal indicates that the wake-up keyword has not been detected, the speech recognition server 110 may set the speech recognition model that is not combined with the wake-up keyword model.

In operation S207, the speech recognition server 110 may recognize the received speech signal of the user 101 by using the set speech recognition model. In operation S208, the speech recognition server 110 may remove the wake-up keyword from the speech recognition result. The speech recognition server 110 may remove the wake-up keyword from the speech recognition result by using the tag added to the wake-up keyword when the wake-up keyword model is registered.

In operation S209, the speech recognition server 110 may transmit the speech recognition result, from which the wake-up keyword is removed, to the device 100. In operation S210, the device 100 may control the device 100 according to the received speech recognition result.

Figure 6:
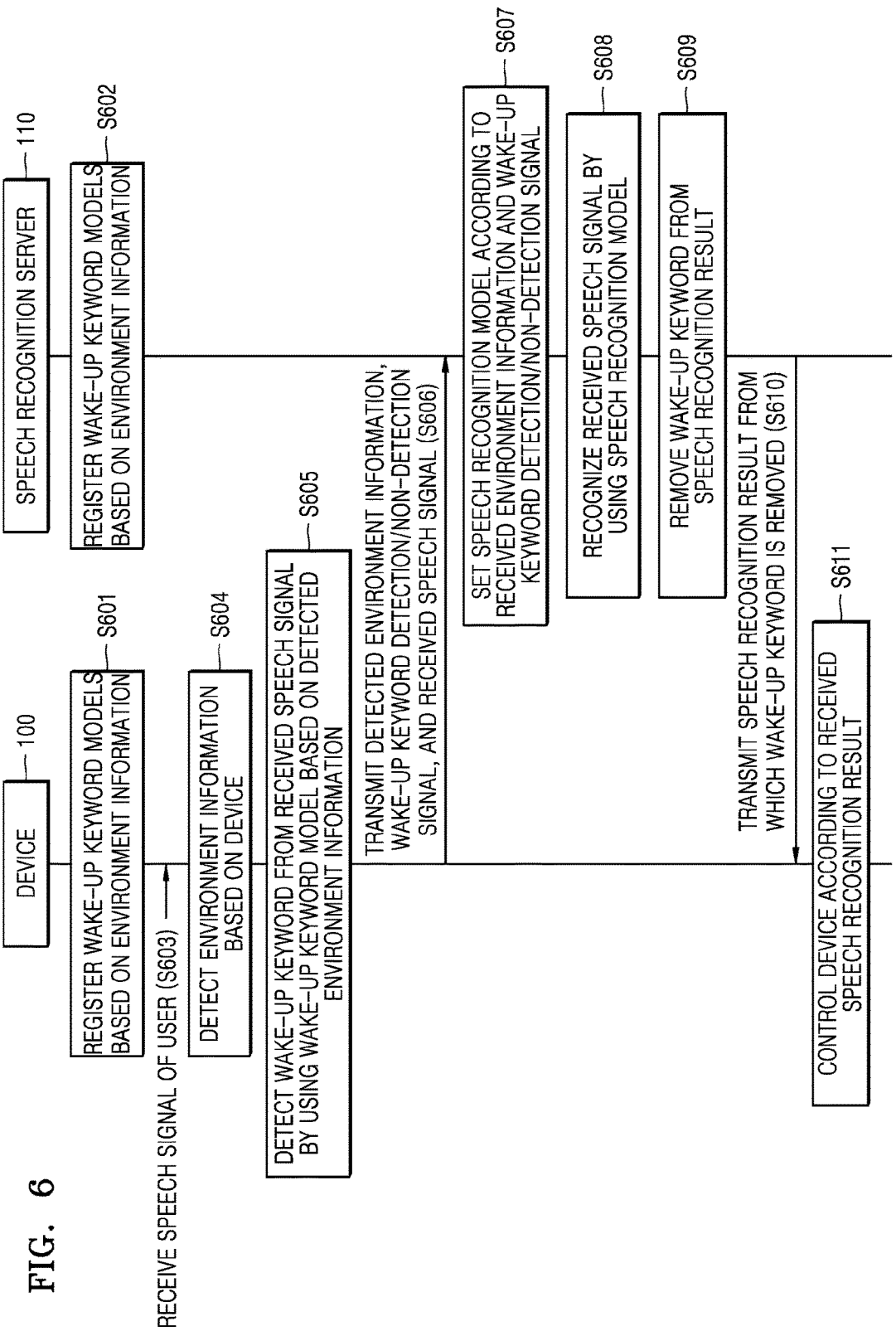
FIGS. 6 and 7 are flowcharts of speech recognition methods according to an exemplary embodiment, which are performed based on the device and the speech recognition server included in the speech recognition system.

FIG. 6 is a flowchart of a speech recognition method according to an exemplary embodiment, which is performed based on the device 100 and the speech recognition server 110 included in the speech recognition system 10. FIG. 6 illustrates an example of speech recognition that is performed by using a wake-up keyword model according to environment information based on the device 100.

In operation S601, the device 100 may register a plurality of wake-up keyword models based on environment information. The environment information may include location information. The location information may include physical location information and logical location information. The physical location information refers to information represented by latitude and longitude. The logical location information refers to information represented by semantic information such as home, office, or cafe. The environment information may include weather information. The environment information may include time information. The environment information may include schedule information. The environment information may include location, time, weather, and/or schedule information. The environment information is not limited thereto, and the environment information may include condition information or situation information that directly or indirectly influence the user 101.

For example, the device 100 may differently register the wake-up keyword model when the location of the device 100 is home and the wake-up keyword model when the location of the device 100 is office. The device 100 may differently register the wake-up keyword model when the time detected by the device 100 is 6 a.m. and the wake-up keyword model when the time detected by the device 100 is 6 p.m. The device 100 may differently register the wake-up keyword model when the weather detected by the device 100 is fine and the wake-up keyword model when the weather detected by the device 100 is rainy. The device 100 may register a different wake-up keyword model according to the schedule of the user 101 that is detected by the device 100.

In operation S601, the device 100 may receive the plurality of wake-up keyword models from the speech recognition server 110, based on the environment information and register the plurality of wake-up keyword models, as described in operation S201.

In operation S602, the speech recognition server 110 may register a plurality of wake-up keyword models based on environment information.

The plurality of wake-up keyword models registered in the speech recognition server 110 may be synchronized in real time with the plurality of wake-up keyword models registered in the device 100. Accordingly, whenever the plurality of wake-up keyword models registered in the device 100 are updated, the plurality of wake-up keyword models registered in the speech recognition server 110 may be updated.

In operation S602, the speech recognition server 110 may register the plurality of wake-up keyword models received from the device 100. In operation S602, the speech recognition server 110 may request the device 100 to send the plurality of wake-up keyword models and receive the plurality of wake-up keyword models from the device 100.

In operation S602, as described in operation S202, the speech recognition server 110 may set a communication channel between the device 100 and the speech recognition server 110 and generate and register the plurality of wake-up keyword models based on the above-described environment information by using the speech signal of the user 101 received from the device 100 via the set communication channel. The speech recognition server 110 may provide the device 100 with the plurality of registered wake-up keyword models.

In operation S603, the device 100 may receive the speech signal of the user 101. In operation S604, the device 100 may detect environment information based on the device 100. The device 100 may detect the environment information based on the device 100 by using sensors included in the device 100 or applications set in the device 100.

For example, the device 100 may detect location information by using a position sensor (e.g., global positioning system (GPS) sensor) included in the device 100. The device 100 may detect time information by using a timer application set in the device 100. The device 100 may detect weather information by using a weather application set in the device 100. The device 100 may detect a schedule of the user 101 by using a schedule application set in the device 100.

In operation S605, the device 100 may detect the wake-up keyword from the received speech signal of the user 101 by using the wake-up keyword model corresponding to the detected environment information among the plurality of registered wake-up keyword models.

For example, in a case where the wake-up keyword model at the home is "Hi" and the wake-up keyword model in the office is "Good", if the location of the device 100 detected by the device 100 is office, the device 100 may detect the wake-up keyword from the received speech signal of the user 101 by using "Good".

In operation S606, the device 100 may transmit the detected environment information, the wake-up keyword detection/non-detection signal, and the received speech signal of the user 101 to the speech recognition server 110.

In operation S607, the speech recognition server 110 may determine the wake-up keyword model according to the wake-up keyword detection/non-detection signal and the received environment information based on the device 100, and set the speech recognition model that is combined with the determined wake-up keyword model.

In operation S608, the speech recognition server 110 may recognize the received speech signal of the user 101 by using the set speech recognition model. In operation S609, the speech recognition server 110 may remove the wake-up keyword from the speech recognition result. The speech recognition server 110 may remove the wake-up keyword from the speech recognition result by using the tag added to the wake-up keyword when the wake-up keyword model is registered.

In operation S610, the speech recognition server 110 may transmit the speech recognition result, from which the wake-up keyword is removed, to the device 100. In operation S611, the device 100 may control the device 100 according to the received speech recognition result.

Figure 7:
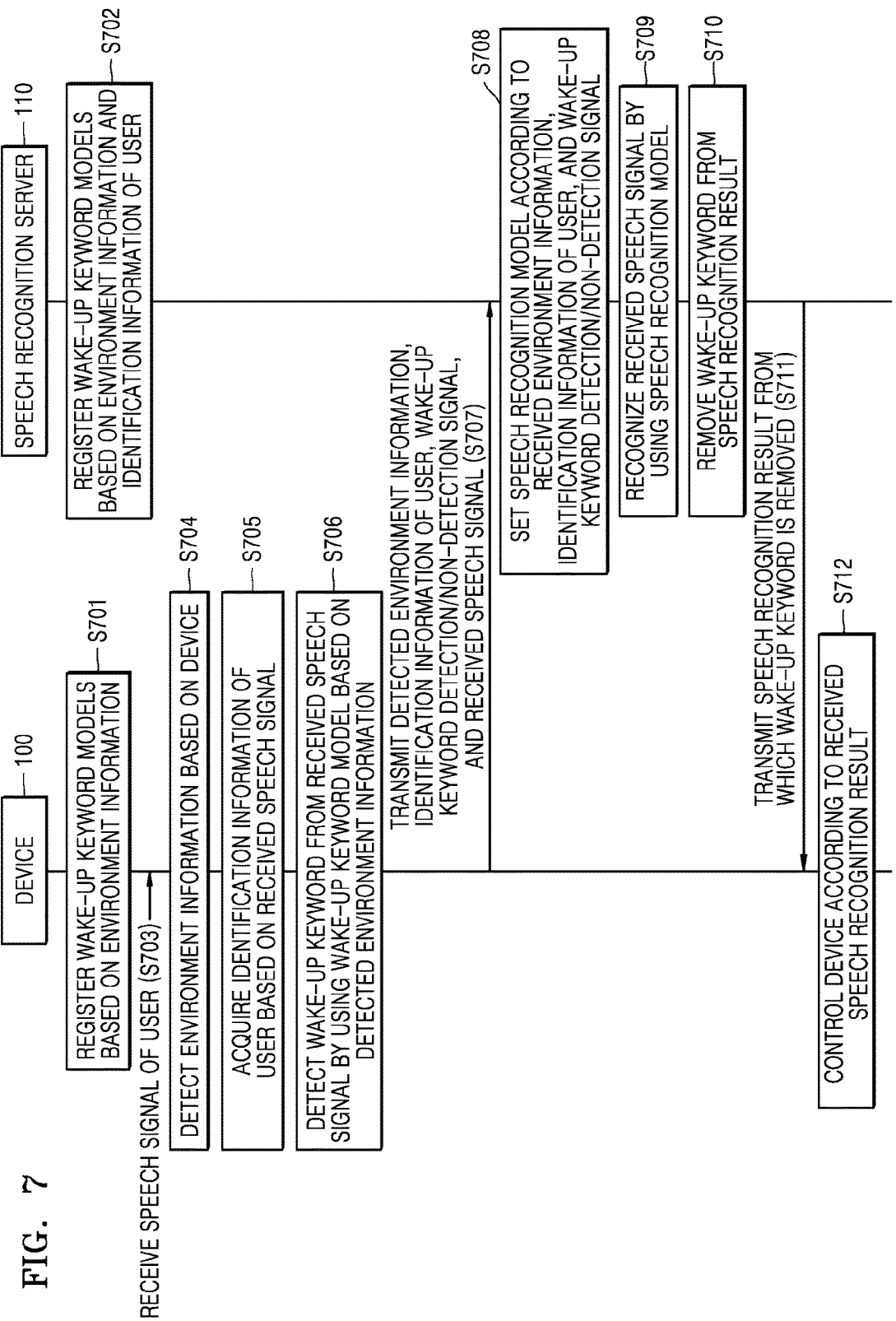

FIG. 7 is a flowchart of a speech recognition method according to an exemplary embodiment, which is performed based on the device 100 and the speech recognition server 110 included in the speech recognition system 10. FIG. 7 illustrates an example of speech recognition that is performed by setting the speech recognition model according to the identification information of the user 101, the environment information based on the device 100, and the wake-up keyword detection/non-detection signal.

In operation S701, the device 100 may register a plurality of wake-up keyword models based on environment information. The environment information may be substantially the same as described in operation S601 of FIG. 6, but is not limited thereto. In operation S701, the device 100 may register the plurality of wake-up keyword models received from the speech recognition server 110.

In operation S702, the speech recognition server 110 may register a plurality of wake-up keyword models based on the environment information and the identification information of the user 101. For example, the speech recognition server 110 may register a plurality of wake-up keyword models based on environment information with respect to identification information A of the user 101. The speech recognition server 110 may register a plurality of wake-up keyword models based on environment information with respect to identification information B of the user 101.

The plurality of wake-up keyword models registered in the speech recognition server 110 may be synchronized with respect to each user. For example, when the plurality of wake-up keyword models of a user A are updated, the plurality of wake-up keyword models of the user A among the plurality of wake-up keyword models registered in the speech recognition server 110 are also updated.

In operation S702, the speech recognition server 110 may register the wake-up keyword models based on the speech signal of the user 101 received from the device 100. In this case, the speech recognition server 110 may provide the device 100 with the plurality of registered wake-up keyword models.

In operation S703, the device 100 may receive the speech signal of the user 101. In operation S704, the device 100 may detect the environment information based on the device 100. In operation S705, the device 100 may acquire the identification information of the user 101 based on the received speech signal of the user 101. The identification information of the user 101 may include a nickname, a gender, and a name of the user 101, but is not limited thereto.

In operation S705, the identification information of the user 101 may be acquired by using a fingerprint recognition technique or an iris recognition technique.

In operation S706, the device 100 may detect the wake-up keyword from the received speech signal of the user 101 by using the wake-up keyword model corresponding to the detected environment information among the plurality of registered wake-up keyword models.

In operation S707, the device 100 may transmit the detected environment information, the identification information of the user 101, the wake-up keyword detection/non-detection signal, and the received speech signal of the user 101 to the speech recognition server 110.

In operation S708, the speech recognition server 110 may determine the wake-up keyword model according to the wake-up keyword detection/non-detection signal, the received environment information based on the device 100, and the identification information of the user 101, and set the speech recognition model that is combined with the determined wake-up keyword model.

In operation S709, the speech recognition server 110 may recognize the received speech signal of the user 101 by using the set speech recognition model. In operation S710, the speech recognition server 110 may remove the wake-up keyword from the speech recognition result. The speech recognition server 110 may remove the wake-up keyword from the speech recognition result by using the tag added to the wake-up keyword when the wake-up keyword model is registered.

In operation S711, the speech recognition server 110 may transmit the speech recognition result, from which the wake-up keyword is removed, to the device 100. In operation S712, the device 100 may control the device 100 according to the received speech recognition result.

Figure 8:
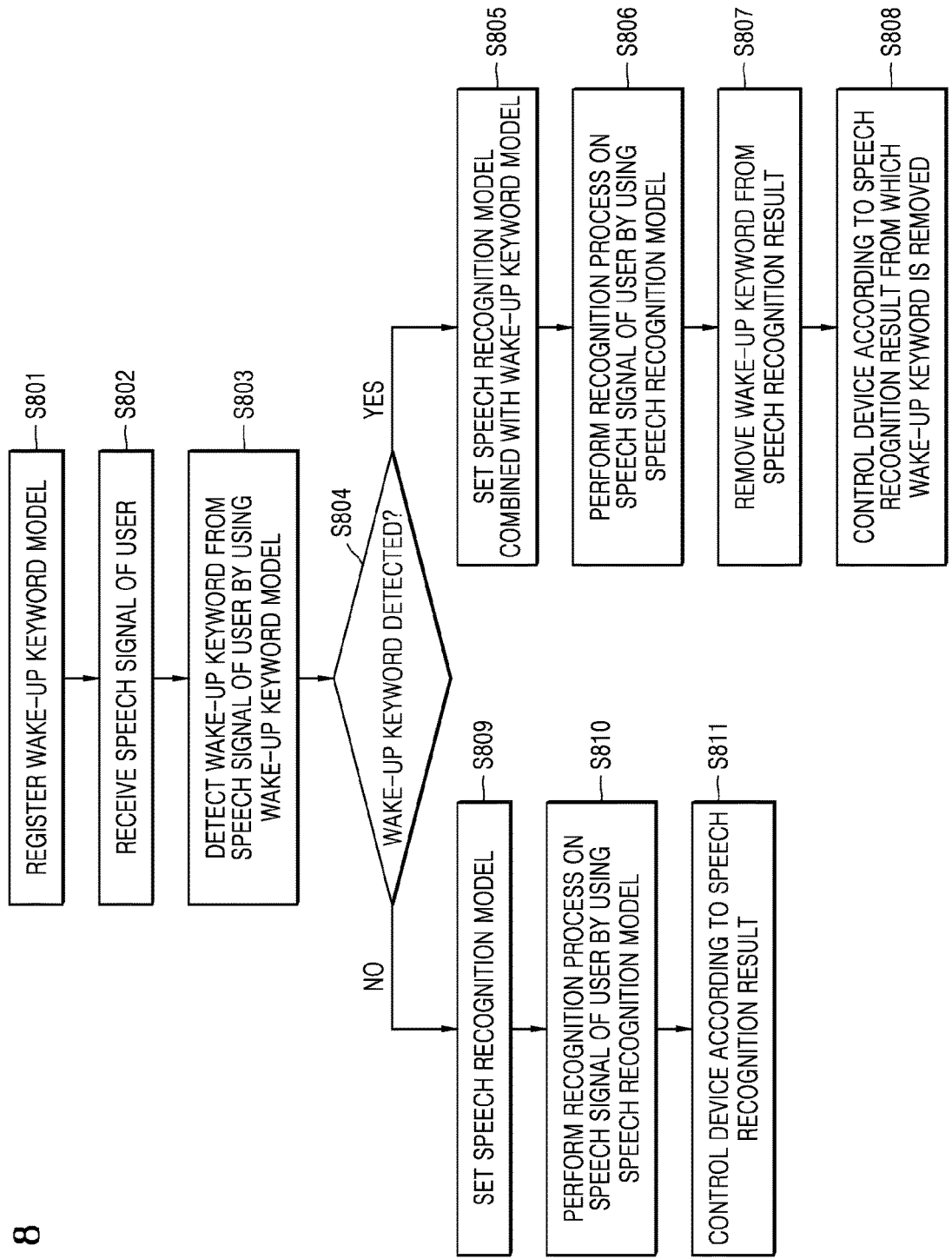
FIG. 8 is a flowchart of a speech recognition method according to an exemplary embodiment, which is performed by a device.

FIG. 8 is a flowchart of a speech recognition method according to an exemplary embodiment, which is performed by the device 100. FIG. 8 illustrates a case where the speech recognition is performed by the device 100, regardless of the speech recognition server 110.

In operation S801, the device 100 may register a wake-up keyword model. When the wake-up keyword model is registered, the device 100 may add a tag to a wake-up keyword so as to identify the wake-up keyword. In operation S801, the device 100 may receive the wake-up keyword model from the speech recognition server 110 and register the received wake-up keyword model.

In operation S802, the device 100 may receive a speech signal of a user 101. In operation S803, the device 100 may detect the wake-up keyword from the speech signal of the user 101 by using the wake-up keyword model.

When it is determined in operation S804 that the wake-up keyword is detected, the device 100 proceeds to operation S805 to set the speech recognition model that is combined with the wake-up keyword model. In operation S806, the device 100 may perform a speech recognition process on the received speech signal of the user 101 by using the speech recognition model.

In operation S807, the device 100 may remove the wake-up keyword from the speech recognition result. The device 100 may remove the wake-up keyword from the speech recognition result by using the tag that identifies the wake-up keyword. In operation S808, the device 100 may control the device 100 according to the speech recognition result, from which the wake-up keyword is removed.

When it is determined in operation S804 that the wake-up keyword is not detected, the device 100 proceeds to operation S809 to set the speech recognition model that is not combined with the wake-up keyword model. In operation S810, the device 100 may perform a speech recognition process on the received speech signal of the user 101 by using the speech recognition model. In operation S811, the device 100 may control the device 100 according to the speech recognition result.

The speech recognition method of FIG. 8 may be modified to register a plurality of wake-up keyword models based on environment information and recognize a speech signal, as described with reference to FIG. 6.

The speech recognition method of FIGS. 2, 6, 7, and/or 8 may be modified to register a plurality of wake-up keyword models, regardless of environment information, and recognize a speech signal. The plurality of wake-up keyword models may be set for each user. When the plurality of wake-up keyword models are registered, each of the wake-up keyword models may include identification information capable of identifying the wake-up keyword.

Figure 9:
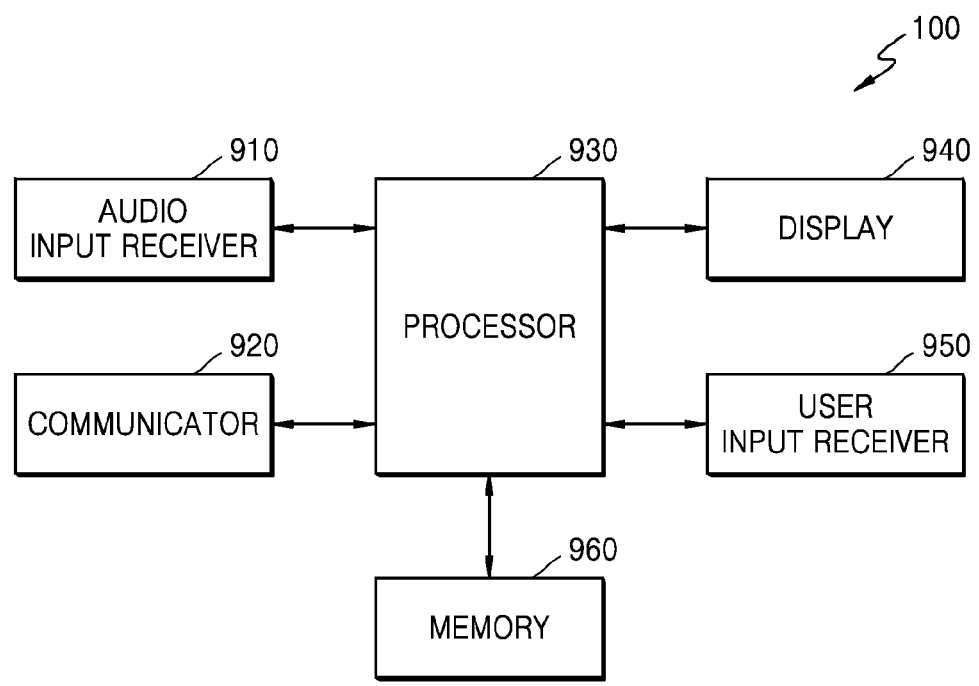
FIGS. 9 and 10 are configuration diagrams of the device included in the speech recognition system according to an exemplary embodiment.

FIG. 9 is a functional block diagram of a device 100 according to an exemplary embodiment.

Referring to FIG. 9, the device 100 may include an audio input receiver 910, a communicator 920, a processor 930, a display 940, a user input receiver 950, and a memory 960.

The audio input receiver 910 may receive a speech signal of a user 101. The audio input receiver 910 may receive a sound (audio signal) based on a particular gesture of the user 101.

The audio input receiver 910 may receive an audio signal that is input from the outside of the device 100. The audio input receiver 910 may convert the received audio signal into an electrical audio signal and transmit the electrical audio signal to the processor 930. The audio input receiver 910 may be configured to perform operations based on various noise removal algorithms for removing noise generated in the process of receiving external acoustic signals. The audio input receiver 910 may include a microphone.

The communicator 920 may be configured to connect the device 100 to the speech recognition server 110 via a wired and/or wireless network. The communicator 920 may be implemented to have substantially the same configuration as a communicator 1040 to be described with reference to FIG. 10.

The processor 930 may be a controller that controls the operation of the device 100. The processor 930 may control the audio input receiver 910, the communicator 920, the display 940, the user input receiver 950, and the memory 960. When the speech signal of the user 101 is received through the audio input receiver 910, the processor 930 may perform a speech recognition process using the wake-up keyword model in real time.

The processor 930 may register the wake-up keyword model in the memory 960. The processor 930 may register, in the memory 960, the wake-up keyword model received from the speech recognition server 110 via the communicator 920. The processor 930 may request the wake-up keyword model based on the speech signal of the user 101 while transmitting the speech signal of the user, which is received via the audio input receiver 910, to the speech recognition server 110.

The processor 930 may transmit the wake-up keyword model registered in the memory 960 to the speech recognition server 110 via the communicator 920. When a wake-up keyword model request signal is received from the speech recognition server 110 via the communicator 920, the processor 930 may transmit the registered wake-up keyword model to the speech recognition server 110. The processor 930 may transmit the registered wake-up keyword model to the speech recognition server 110 at the same time as the registration of the wake-up keyword model in the memory 960.

The processor 930 may detect the wake-up keyword from the received speech signal of the user 101 by using the wake-up keyword model registered in the memory 960 as the speech signal of the user 101 is received through the audio input receiver 910. The processor 930 may transmit a wake-up keyword detection/non-detection signal and the received speech signal of the user 101 to the speech recognition server 110 via the communicator 920.

The processor 930 may receive the speech recognition result from the speech recognition server 110 via the communicator 920. The processor 930 may control the device 100 according to the received speech recognition result.

When an audio signal for registering the wake-up keyword model is received through the audio input receiver 910, the processor 930 may determine whether the audio signal is usable as the wake-up keyword model, based on a matching rate of the audio signal, as described above.

The processor 930 may register a candidate wake-up keyword model, which is selected among candidate wake-up keyword models stored in the memory 960, in the memory 960 according to a user input received through the user input receiver 950.

The processor 930 may include a main processor and a sub processor according to an implementation type of the device 100. The sub processor may be set as a low-power processor.

The display 940 may be configured to display the candidate wake-up keyword requested by the user 101 under the control of the processor 930. The display 940 may include a liquid crystal display (LCD), a thin-film transistor-liquid crystal display (TFT-LCD), an organic light-emitting diode (OLED), a flexible display, a three-dimensional (3D) display, or an electrophoretic display (EPD). The display 940 may include, for example, a touch screen, but is not limited thereto.

The user input receiver 950 may be configured to receive a user input with respect to the device 100. The user input receiver 950 may receive a user input of requesting registration of the wake-up keyword, a user input of selecting one among candidate wake-up keywords, and/or a user input of registering the selected candidate wake-up keyword. The user input received through the user input receiver 950 is not limited thereto. The user input receiver 950 may transmit the received user input to the processor 930.

The memory 960 may store the wake-up keyword model. The memory 960 may store programs for processing and control of the processor 930. The programs stored in the memory 960 may include an operating system (OS) and various application programs. The various application programs may include the speech recognition program and the camera application. The memory 960 may store information managed by the application programs, for example, wake-up keyword use history information of the user 101, schedule information of the user 101, and/or the profile information of the user 101.

The programs stored in the memory 960 may include a plurality of modules according to functions thereof. The plurality of modules may include, for example, a mobile communication module, a wireless fidelity (Wi-Fi) module, a Bluetooth module, a digital multimedia broadcasting (DMB) module, a camera module, a sensor module, a GPS module, a video reproduction module, an audio reproduction module, a power module, a touch screen module, a user interface (UI) module, and/or an application module.

The memory 960 may include a flash memory, a hard disk, a multimedia card micro type memory, a card type memory (e.g., SD or XD memory), random access memory (RAM), static random access memory (SRAM), read-only memory (ROM), electrically erasable programmable read-only memory (EEPROM), programmable read-only memory (PROM), a magnetic memory, a magnetic disk, or an optical disk.

Figure 10:
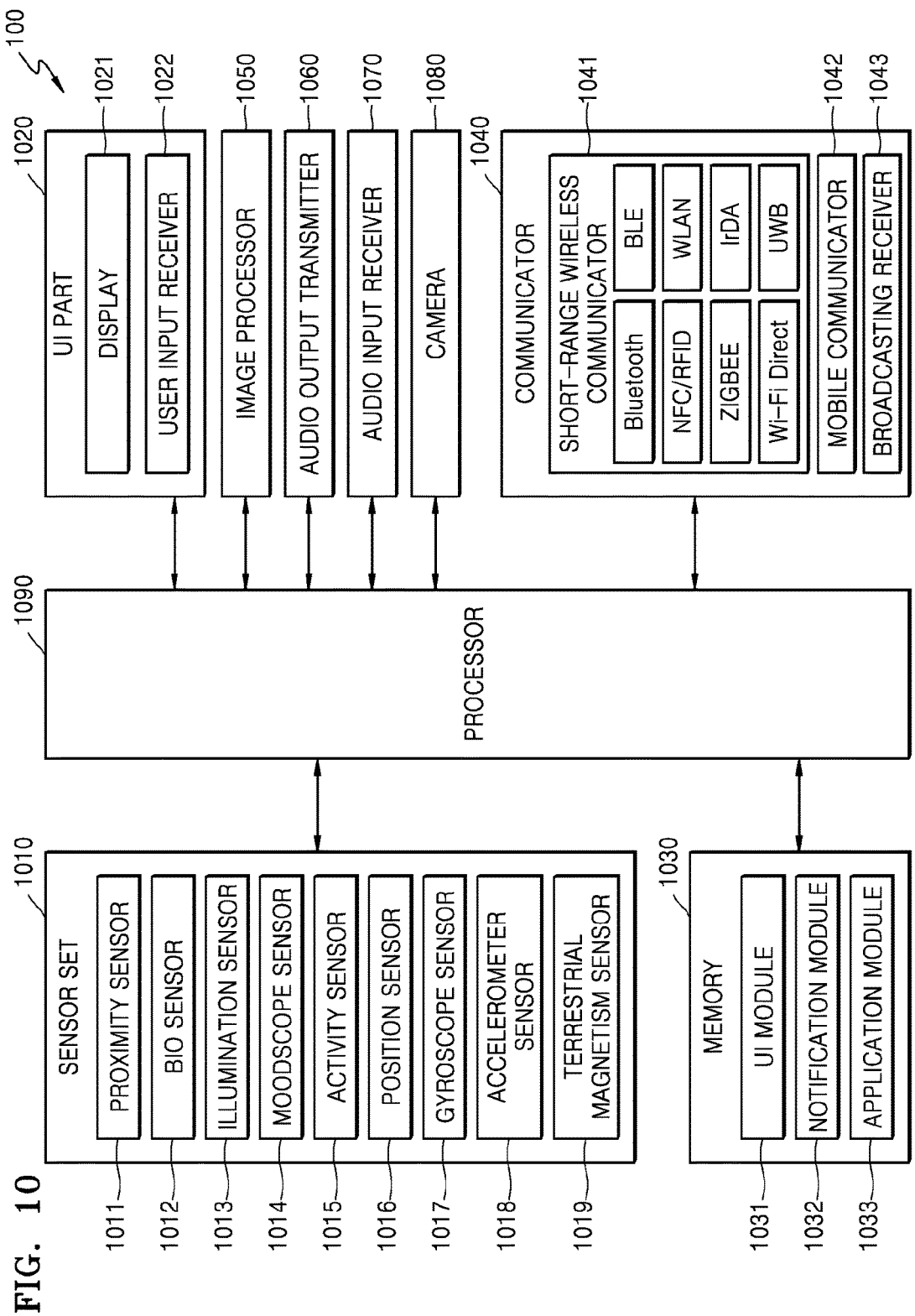

FIG. 10 is a block diagram of the device 100 according to an exemplary embodiment.

Referring to FIG. 10, the device 100 may include a sensor set 1010, a UI 1020, a memory 1030, a communicator 1040, an image processor 1050, an audio output transmitter 1060, an audio input receiver 1070, a camera 1080, and a processor 1090.

The device 100 may include a battery. The battery may be internally included in the device 100, or may be detachably included in the device 100. The battery may supply power to all elements included in the device 100. The device 100 may be supplied with power from an external power supply (not illustrated) via the communicator 1040. The device 100 may further include a connector that is connectable to the external power supply.

The processor 1090, the display 1021 and the user input receiver 1022 included in the UI 1020, the memory 1030, the audio input receiver 1070, and the communicator 1040, which are illustrated in FIG. 10, may be substantially similar or identical to the processor 930, the audio input receiver 910, the communicator 920, the display 940, the user input receiver 950, and the memory 960, which are illustrated in FIG. 9.

The programs stored in the memory 1030 may include a plurality of modules according to functions thereof. For example, the programs stored in the memory 1030 may include a UI module 1031, a notification module 1032, and an application module 1033, but are not limited thereto. For example, as in the memory 960 of FIG. 9, the programs stored in the memory 1030 may include a plurality of modules.

The UI module 1031 may provide the processor 1090 with a graphical UI (GUI) information for registering the wake-up keyword for speech recognition, GUI information indicating the speech recognition result (e.g., text information), and GUI information indicating a speech recognition waveform. The processor 1090 may display a screen on the display 1021 based on the GUI information received from the UI module 1031. The UI module 1031 may provide the processor 1090 with a UI and/or a GUI specialized with respect to each application installed on the device 100.

The notification module 1032 may provide a notification based on speech recognition, a notification based on registration of the wake-up keyword, a notification based on incorrect input of the wake-up keyword, or a notification based on recognition of the wake-up keyword, but is not limited thereto.

The notification module 1032 may output a notification signal through the display 1021 as a video signal, or may output a notification signal through the audio output transmitter 1060 as an audio signal, but is not limited thereto.

The application module 1033 may include various applications, in addition to the speech recognition application described above.

The communicator 1040 may include one or more elements for communications between the device 100 and at least one external device (e.g., the speech recognition server 110, a smart TV, a smart watch, a smart mirror, and/or an IoT network based device, etc.). For example, the communicator 1040 may include at least one among a short-range wireless communicator 1041, a mobile communicator 1042, and a broadcasting receiver 1043, but is not limited thereto.

The short-range wireless communicator 1041 may include at least one among a Bluetooth communication module, a Bluetooth Low Energy (BLE) communication module, a near field communication (NFC) module, a wireless local area network (WLAN) (WiFi) communication module, a Zigbee communication module, an Ant+ communication module, a Wi-Fi Direction (WFD) communication module, a beacon communication module, and an Ultra WideB and (UWB) communication module, but is not limited thereto. For example, the short-range wireless communicator 1041 may include an infrared data association (IrDA) communication module.

The mobile communicator 1042 may transmit and receive a wireless signal with at least one among a base station, an external device, and a server via a mobile communication network. The wireless signal may include a voice call signal, a video call signal, or various types of data according to transmission and reception of text/multimedia messages.

The broadcasting receiver 1043 may receive broadcasting signals and/or broadcasting-related information from the outside via a broadcasting channel.

The broadcasting channel may include at least one among a satellite channel, a terrestrial channel, and a radio channel, but is not limited thereto.

In exemplary embodiments, the communicator 1040 may transmit at least one piece of information generated by the device 100 to at least one external device, or may receive information from at least one external device.

The sensor set 1010 may include a proximity sensor 1011 configured to sense an approach of the user 101 to the device 100, a bio sensor 1012, e.g., a heartbeat sensor, a blood flow meter, a diabetes sensor, a blood pressure sensor, and/or a stress sensor), configured to sense health information of the user 101 of the device 100, an illumination sensor 1013, e.g., a light-emitting diode (LED) sensor, configured to sense ambient illumination of the device 100, a moodscope sensor 1014 configured to sense a mood of the user 101 of the device 100, an activity sensor 1015 configured to sense activity, a position sensor 1016, e.g., a GPS receiver, configured to detect a position of the device 100, a gyroscope sensor 1017 configured to measure an azimuth angle of the device 100, an accelerometer sensor 1018 configured to measure a slope and acceleration of the device 100 with respect to the surface of the earth, and/or a terrestrial magnetism sensor 1019 configured to sense azimuth orientation with respect to the device 100, but is not limited thereto.

For example, the sensor set 1010 may include a temperature/humidity sensor, a gravity sensor, an altitude sensor, a chemical sensor (e.g., an odorant sensor), a barometric pressure sensor, a fine dust measurement sensor, an ultraviolet sensor, an ozone sensor, a carbon dioxide ($CO_2$) sensor, and/or a network sensor (e.g., a network sensor based on Wi-Fi, Bluetooth, 3G, Long Term Evolution (LTE), and/or NFC), but is not limited thereto.

The sensor set 1010 may include a pressure sensor (e.g., a touch sensor, a piezoelectric sensor, a physical button, etc.), a state sensor (e.g., an earphone terminal, a DMB antenna, etc.), a standard terminal (e.g., a terminal capable of recognizing whether charging is in progress, a terminal capable of recognizing whether a PC is connected, a terminal capable of recognizing whether a dock is connected, etc.), and/or a time sensor, but is not limited thereto.

The sensor set 1010 may include less sensors than those illustrated in FIG. 10. For example, the sensor set 1010 may include only the position sensor 1016. In a case where the sensor set 1010 includes only the position sensor 1016, the sensor set 1010 may be referred to as a GPS receiver.

The results (or sensing values) sensed by the sensor set 1010 may be transmitted to the processor 1090. When the sensing value received from the sensor set 1010 is a value indicating a position, the processor 1090 may determine whether a current position of the device 100 is home or office, based on the received sensing value.

The processor 1090 may operate as a controller configured to an overall operation of the device 100. For example, the processor 1090 may control the sensor set 1010, the memory 1030, the UI 1020, the image processor 1050, the audio output transmitter 1060, the audio input receiver 1070, the camera 1080, and/or the communicator 1040 by executing the programs stored in the memory 1030.

The processor 1090 may operate in the same manner as the processor 930 of FIG. 9. For an operation of reading data from the memory 1030, the processor 1090 may perform an operation of receiving data from an external device via the communicator 1040. For an operation of writing data to the memory 1030, the processor 1090 may perform an operation of transmitting data to an external device via the communicator 1040.

The processor 1090 may perform at least one operation described above with reference to FIGS. 2, 3, and 4 to 8. The processor 1090 may be a controller configured to control the above-described operations.

The image processor 1050 may be configured to display image data received from the communicator 1040 or image data stored in the memory 1030 on the display 1021.

The audio output transmitter 1060 may output audio data received from the communicator 1040 or audio data stored in the memory 1030. The audio output transmitter 1060 may output an audio signal (e.g., a notification sound) related to the functions performed by the device 100.

The audio output transmitter 1060 may include a speaker or a buzzer, but is not limited thereto.

Figure 11:
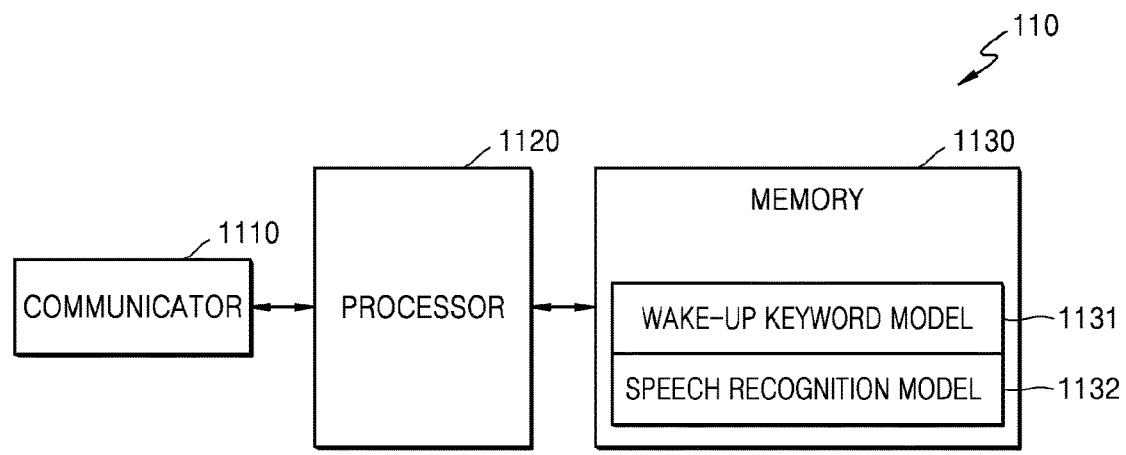
FIG. 11 is a configuration diagram of the speech recognition server included in the speech recognition system according to an exemplary embodiment.

FIG. 11 is a functional block diagram of the speech recognition server 110 according to an exemplary embodiment.

Referring to FIG. 11, the speech recognition server 110 may include a communicator 1110, a processor 1120, and a memory 1130, but is not limited thereto. The speech recognition server 110 may include less or more elements than those illustrated in FIG. 11.

The communicator 1110 may be substantially the same as the communicator 1040 illustrated in FIG. 10. The communicator 1110 may transmit a speech recognition related signal to the device 100 and receive a speech recognition related signal from the device 100.

The processor 1120 may perform the operation of the speech recognition server 110 described above with reference to FIGS. 2, 6, and 7.

The memory 1130 may store the wake-up keyword model 1131 and the speech recognition model 1132 and may provide the processor 1120 with the wake-up keyword model 1131 and the speech recognition model 1132 under the control of the processor 1120. The speech recognition model 1132 may be referred to as a model for recognizing the voice command.

The wake-up keyword model 1131 and the speech recognition model 1132, which are stored in the memory 1130, may be updated according to the information received via the communicator 1110. The wake-up keyword model 1131 and the speech recognition model 1132, which are stored in the memory 1130, may be updated according to information input by an operator. To this end, the speech recognition server 110 may further include an element configured to allow the operator to input information.

Figure 12:
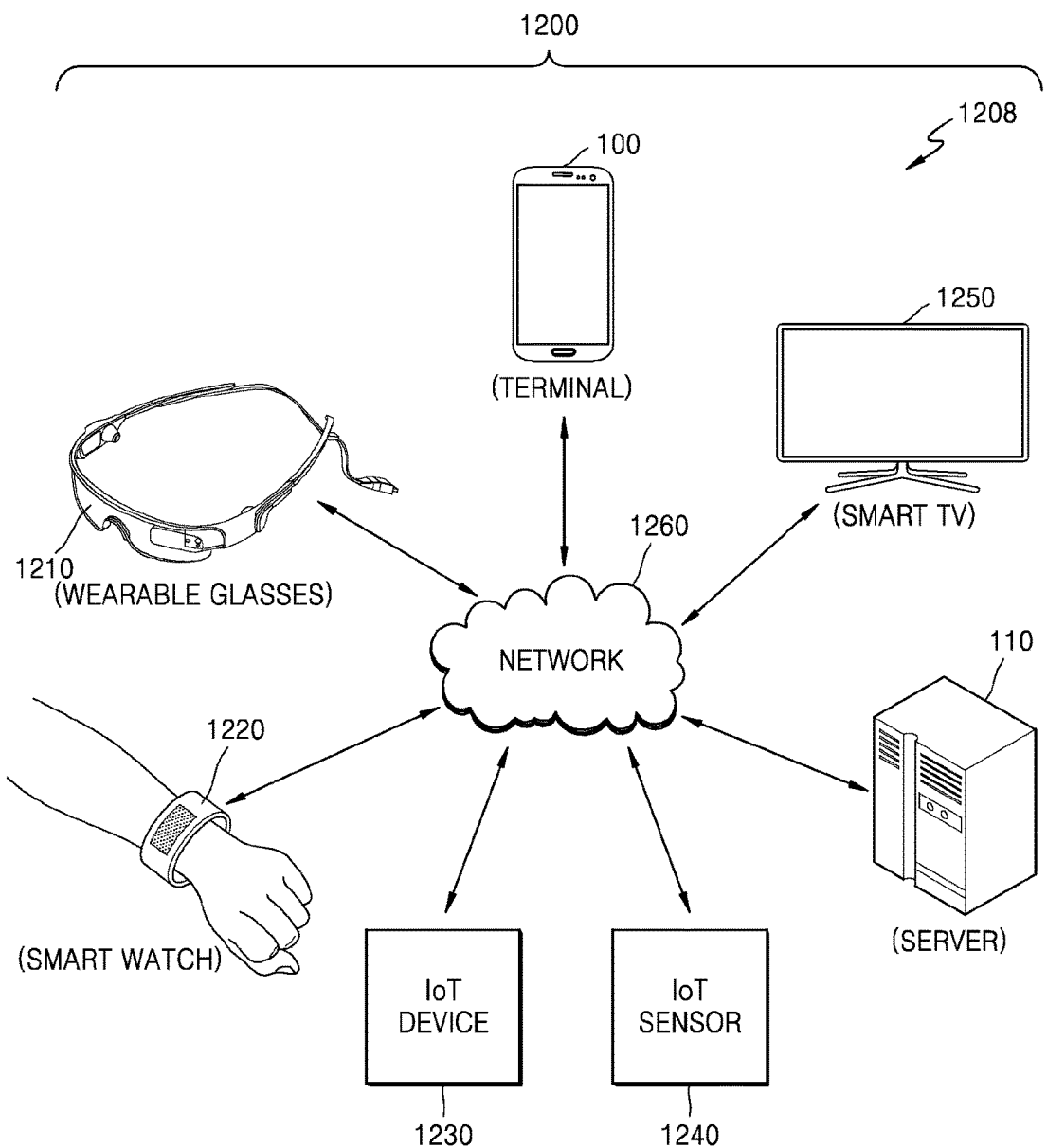
FIG. 12 is a configuration diagram of a speech recognition system according to an exemplary embodiment.

FIG. 12 is a configuration diagram of a speech recognition system 1200 according to an exemplary embodiment. FIG. 12 illustrates a case where the speech recognition server 110 recognizes speech signals of the user 101 that are received from a plurality of devices 1208.

The plurality of devices 1208 may include a mobile terminal 100, wearable glasses 1210, a smart watch 1220, an IoT device 1230, an IoT sensor 1240, and/or a smart TV 1250.

Users of the plurality of devices 1208 may be the same person or different persons. When the users of the plurality of devices 1208 are the same person, the speech recognition server 110 may register wake-up keyword models for each device, and perform the speech recognition function. When the users of the plurality of devices 1208 are different persons, the speech recognition server 110 may register wake-up keyword models by using device identification information and user identification information of each device, and perform the speech recognition function. Accordingly, the speech recognition system 1200 may provide various and more accurate speech recognition services. The speech recognition server 110 may provide the plurality of devices 1208 with the registered wake-up keyword models.

In addition, the speech recognition server 110 may estimate noise levels around the plurality of devices 1208 or recognize environment information by using the speech signal as well as the wake-up keyword according to the continuous recognition processing of the wake-up keyword and the voice command. The speech recognition server 110 may provide users with information used, estimated or recognized for controlling the plurality of devices 1208 by providing the plurality of devices 1208 with the estimated noise levels or the recognized environment information together with the speech recognition result.

The network 1260 may be a wired network and/or a wireless network. The network 1260 may allow data to be transmitted and received between the plurality of devices 1208 and the server 110 based on at least one among the communication methods described above in connection with the communicator 1040 illustrated in FIG. 10.

The methods described above with reference to FIGS. 2, 3, and 4 to 8 may be implemented by a computer program. For example, the operation of the device 100 illustrated in FIG. 2 may be performed by a speech recognition application installed on the device 100. The operation of the speech recognition server 110 illustrated in FIG. 2 may be performed by a speech recognition application installed on the speech recognition server 110. The computer program may operate in an OS environment installed on the device 100. The computer program may operate in an OS environment installed on the speech recognition server 110. The device 100 may write the computer program to a storage medium and may read the computer program from the storage medium. The speech recognition server 110 may write the computer program to a storage medium and may read the computer program from the storage medium.

According to an exemplary embodiment, the device 100 may include an audio input receiver 910 configured to receive an audio signal from a user, the audio signal 910 including a wake-up keyword, a memory 960 configured to store wake-up keyword models for identifying the wake-up keyword from the received audio signal, and a processor 930 configured to perform detecting the wake-up keyword from the received audio signal by matching the wake-up keyword included into the received audio signal with the stored wake-up keyword models, generating a detection value indicative whether the wake-up keyword has been detected or not, based on a result of the matching, transmitting the detection value and the received audio signal to a server, receiving, from the server, a speech recognition result of the audio signal that is translated based on the detection value, and controlling an executable application of the device in performing a device function, based on the speech recognition result.

The detection value indicates that the wake-up keyword has been detected in the received audio signal, and the processor 930 is configured to receive the speech recognition result which includes a user command to execute the application, and in which the wake-up keyword itself is absent.

The audio input receiver 910 is configured to receive, in advance, individual user inputs containing individual keywords related to a control of executable applications of the device 100, and the memory 960 is configured to store the wake-up keyword models based on the received individual keywords.

According to an exemplary embodiment, a method may include storing, in a first memory, wake-up keyword models which are used to identify wake-up keywords; receiving an audio signal from a user, the audio signal including the wake-up keyword; detecting the wake-up keyword from the received audio signal by matching the wake-up keyword included into the received audio signal with the stored wake-up keyword models, generating a detection value indicative whether the wake-up keyword has been detected or not based on a result of the matching; transmitting the detection value and the received audio signal to a server, receiving, from the server, a speech recognition result of the audio signal that is translated based on the detection value, and controlling an executable application of the device in performing a device function, based on the speech recognition result.

The method further includes storing, in a second memory, a speech recognition model which is used to translate the audio signal of the user and the wake-up keyword models which are synchronized with the wake-up keyword models stored in the first memory, wherein the receiving the speech recognition result includes: identifying, by the server, whether the audio signal contains the wake-up keyword, from the detection value; and translating, by the server, the audio signal into the speech recognition result based on a combination model in which the speech recognition model is combined with a respective wake-up keyword model in response to the detection value indicating that the audio signal contains the wake-up keyword. The first memory and the second memory may be included in the memory 960.

The receiving the speech recognition result further includes generating, by the server, the speech recognition result by removing the wake-up keyword from the speech recognition result, and receiving, from the server 110, the speech recognition result of the audio signal from which the wake-up keyword has been removed; wherein the controlling includes controlling the executable application of the device 100 according to the speech recognition result from which the wake-up keyword has been removed.

The translating includes translating the audio signal into the speech recognition result by using the speech recognition model only, in response to the detection value indicating that the audio signal does not contain the wake-up keyword.

Exemplary embodiments may be embodied in a storage medium including instruction codes executable by a computer, such as a program module executed by the computer. A computer-readable medium may be any available medium which can be accessed by the computer and may include any volatile/non-volatile media and any removable/non-removable media. Furthermore, the computer-readable medium may include any computer storage and communication media. The computer storage medium may include any volatile/non-volatile and removable/non-removable media embodied by a certain method or technology for storing information such as computer-readable instruction code, a data structure, a program module or other data. The communication media may include computer-readable instruction code, a data structure, a program module, other data of modulated data signals, or other transmission mechanisms, and may include any information transmission media.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A device comprising:
a memory that stores a speech recognition model, and a plurality of personalized wake-up keyword models, the plurality of personalized wake-up keyword models being stored in association with context information; and
a communication interface configured to communicate with an external speech recognition server;
a processor configured to:
obtain user speech data;
identify a personalized wake-up keyword model, from among the plurality of personalized wake-up keyword models, that corresponds to current context information that is related to a current context of the device, the current context information including at least one of: location information, weather information, or detected environment information;
identify, using the identified personalized wake-up keyword model that corresponds to the current context information, whether a wake-up keyword corresponding to a personalized wake-up keyword that corresponds to the current context is included in the obtained user speech data;
transmit, to the external speech recognition server via the communication interface, the obtained user speech data, information that indicates whether the device identified the personalized wake-up keyword that corresponds to the current context information in the obtained user speech data, and the current context information;
receive, from the external speech recognition server via the communication interface, a speech recognition result of the user speech data based on the transmitting of the obtained user speech data, the information that indicates whether the device identified the personalized wake-up keyword that corresponds to the current context information in the obtained user speech data, and the current context information; and control the device according to the speech recognition result, wherein the processor is further configured to:
recognize, in the obtained user speech data, a speech signal for wake-up keyword registering, by using the speech recognition model; and
based on recognizing the speech signal for the wake-up keyword registering, identify whether the speech signal is valid as a new wake-up keyword model, based on a speech matching rate of recognition of the speech signal.

2. The device of claim 1, further comprising an environment information sensor configured to detect the detected environment information, which is environment information about an environment of the device, wherein the plurality of personalized wake-up keyword models are based on various environment information, and the processor is further configured to detect the personalized wake-up keyword from the obtained speech data by using a personalized wake-up keyword model that corresponds to the detected environment information of the device, from among the plurality of personalized wake-up keyword models.

3. The device of claim 2, wherein the detected environment information includes position information of the device.

4. The device of claim 2, wherein the processor is configured to recognize user identification information of a user based on the obtained user speech data of the user, transmit the user identification information and the environment information of the device to the external speech recognition server via the communication interface, and receive, from the external speech recognition server, the speech recognition result based on the user identification information of the user, and the detected environment information.

5. The device of claim 1, further comprising a user input interface configured to receive a user input, wherein the plurality of personalized wake-up keyword models include candidate personalized wake-up keyword models, and
the processor is further configured to register a candidate personalized wake-up keyword model, which is selected among the stored personalized wake-up keyword models, according to the user input received through the user input interface.

6. The device of claim 1, wherein the processor is configured to receive the plurality of personalized wake-up keyword models from the external speech recognition server via the communication interface and register the received personalized wake-up keyword models in the memory in advance.

7. The device of claim 1, wherein the processor is further configured to register the personalized wake-up keyword model in the memory in advance.

8. The device of claim 1, wherein the current context information includes the location information, the location information including at least one of physical location information or logical location information.

9. The device of claim 1, further comprising at least one sensor.

10. The device of claim 9, wherein the at least one sensor includes at least one of: a global positioning system (GPS) sensor that detects the location information or an environment sensor that detects the environment information.

11. A speech recognition server comprising:
a memory configured to store a speech recognition model, and a plurality of personalized wake-up keyword models;

a communication interface configured to communicate with an external device; and a processor configured to:

obtain, from the external device, user speech data, indication information that indicates whether the external device identified a personalized wake-up keyword that corresponds to current context information in the obtained user speech data, and the current context information, the current context information including at least one of:

location information, weather information, or detected environment information; and based on the obtained indication information indicating that the external device identified the personalized wake-up keyword that corresponds to the current context information in the obtained user speech data:

combine the speech recognition model with a personalized wake-up keyword model and recognize the obtained user speech data using the combined model;

generate a speech recognition result by removing the personalized wake-up keyword from the obtained user speech data; and transmit the speech recognition result, from which the personalized wake-up keyword has been removed, to the external device, wherein the processor is further configured to:

recognize, in the obtained user speech data, a speech signal for wake-up keyword registering, by using the speech recognition model; and based on recognizing the speech signal for the wake-up keyword registering, identify whether the speech signal is valid as a new wake-up keyword model, based on a speech matching rate of recognition of the speech signal.

12. The speech recognition server of claim 11, wherein the personalized wake-up keyword model is one of a plurality of wake-up keyword models which are based on various environment information, and the combining of the models includes combining the speech recognition model with a personalized wake-up keyword model corresponding to environment information of the external device included in the obtained current context information, from among the plurality of wake-up keyword models.

13. The speech recognition server of claim 12, wherein the combining of the models includes combining the speech recognition model with a personalized keyword corresponding to user identification information included in the obtained current context information.

14. A speech recognition method, which is performed by a device, the speech recognition method comprising:

obtaining, via a microphone, user speech data;

identifying a personalized wake-up keyword model, from among a plurality of stored personalized wake-up keyword models, that corresponds to current context information that is related to a current context of the device, the current context information including at least one of: location information, weather information, or detected environment information;

identifying, using the identified personalized wake-up keyword model that corresponds to the current context information, whether a wake-up keyword corresponding to a personalized wake-up keyword that corresponds to the current context information is included in the obtained user speech data;

transmitting, to an external speech recognition server, the obtained user speech data, information that indicates whether the device identified the personalized wake-up keyword that corresponds to the current context information in the obtained user speech data, and the current context information;

receiving, from the external speech recognition server via a communication interface, a speech recognition result of the user speech data based on the transmitting of the obtained user speech data, the information that indicates whether the device identified the personalized wake-up keyword that corresponds to the current context information in the obtained user speech data, and the current context information; and controlling the device according to the speech recognition result, wherein a wake-up keyword model registered in the external speech recognition server is synchronized with the wake-up keyword model registered in the device, wherein the speech recognition method further comprises:

recognizing, in the obtained user speech data, a speech signal for wake-up keyword registering, by using a speech recognition model; and based on recognizing the speech signal for the wake-up keyword registering, identifying whether the speech signal is valid as a new wake-up keyword model, based on a speech matching rate of recognition of the speech signal.

15. The speech recognition method of claim 14, wherein the plurality of stored personalized wake-up keyword models are based on various environment information, the speech recognition method further comprises detecting the environment information, which is environment information about an environment of the device, and transmitting the detected environment information to the external speech recognition server, and the identifying the wake-up keyword comprises detecting the wake-up keyword from the user speech data by using a personalized wake-up keyword model corresponding to the detected environment information, from among the plurality of stored personalized wake-up keyword models.

16. The speech recognition method of claim 15, further comprising recognizing user identification information based on the obtained user speech data, wherein the transmitted current context information comprises the user identification information and the environment information.

17. A non-transitory computer-readable recording medium having stored thereon a program which, when executed by a computer system, causes the computer system to perform the speech recognition method of claim 14.

* * * * *